INVENTOR
BEN F. WARE

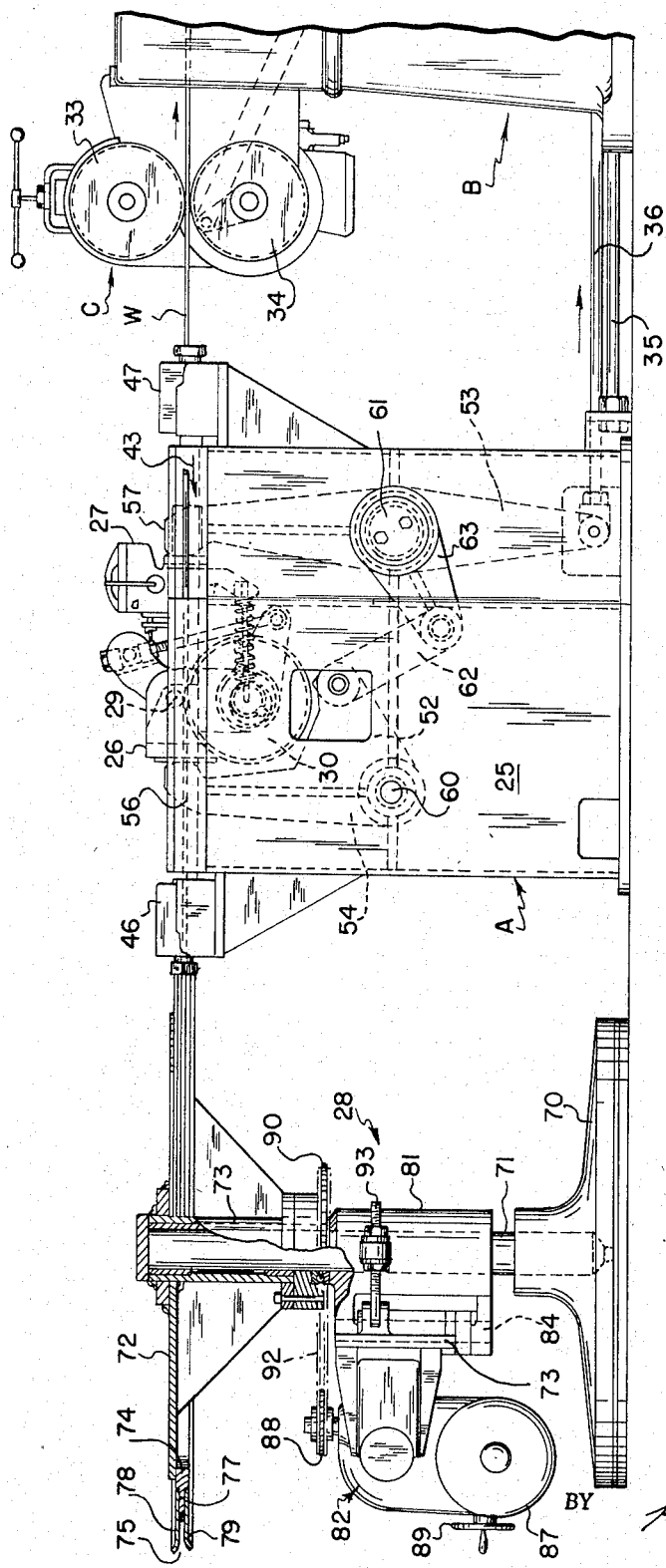

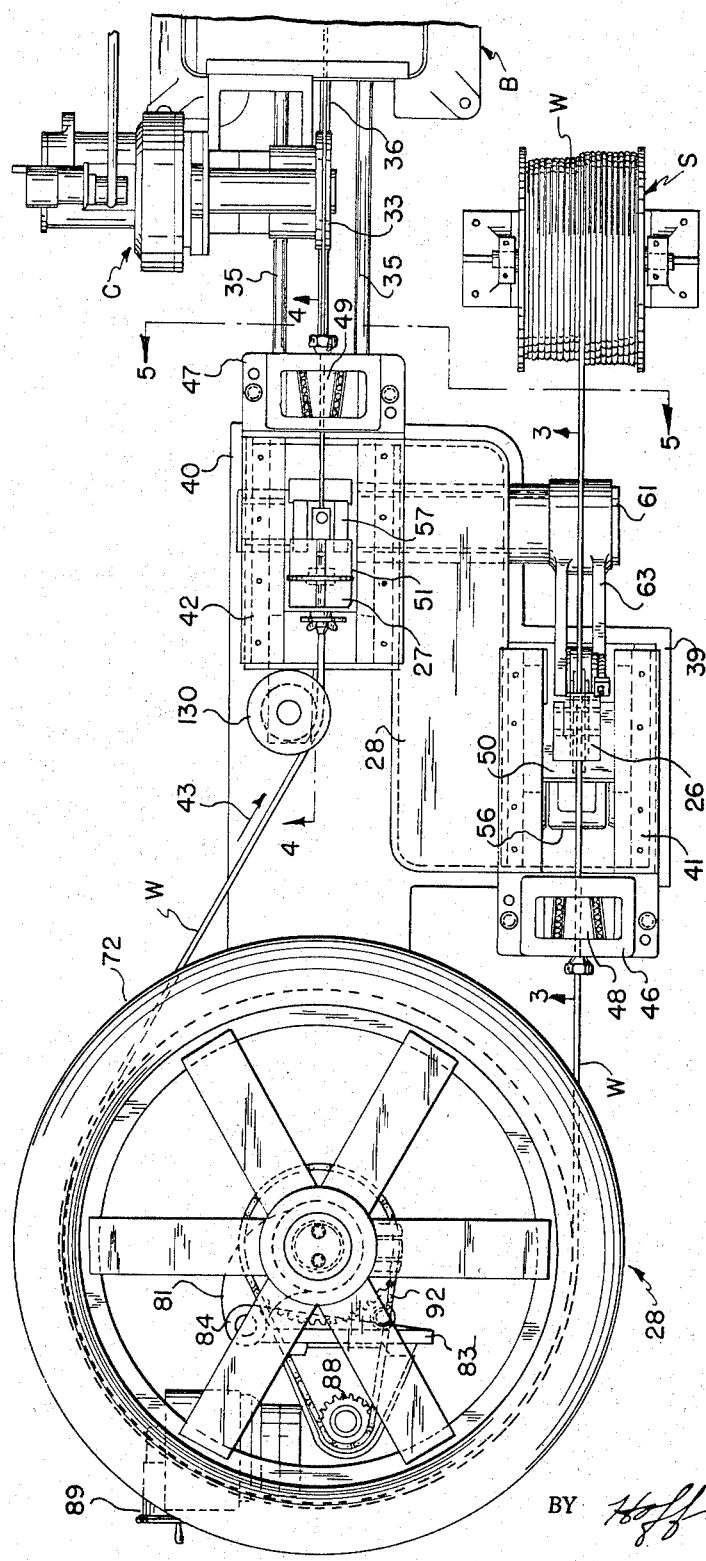

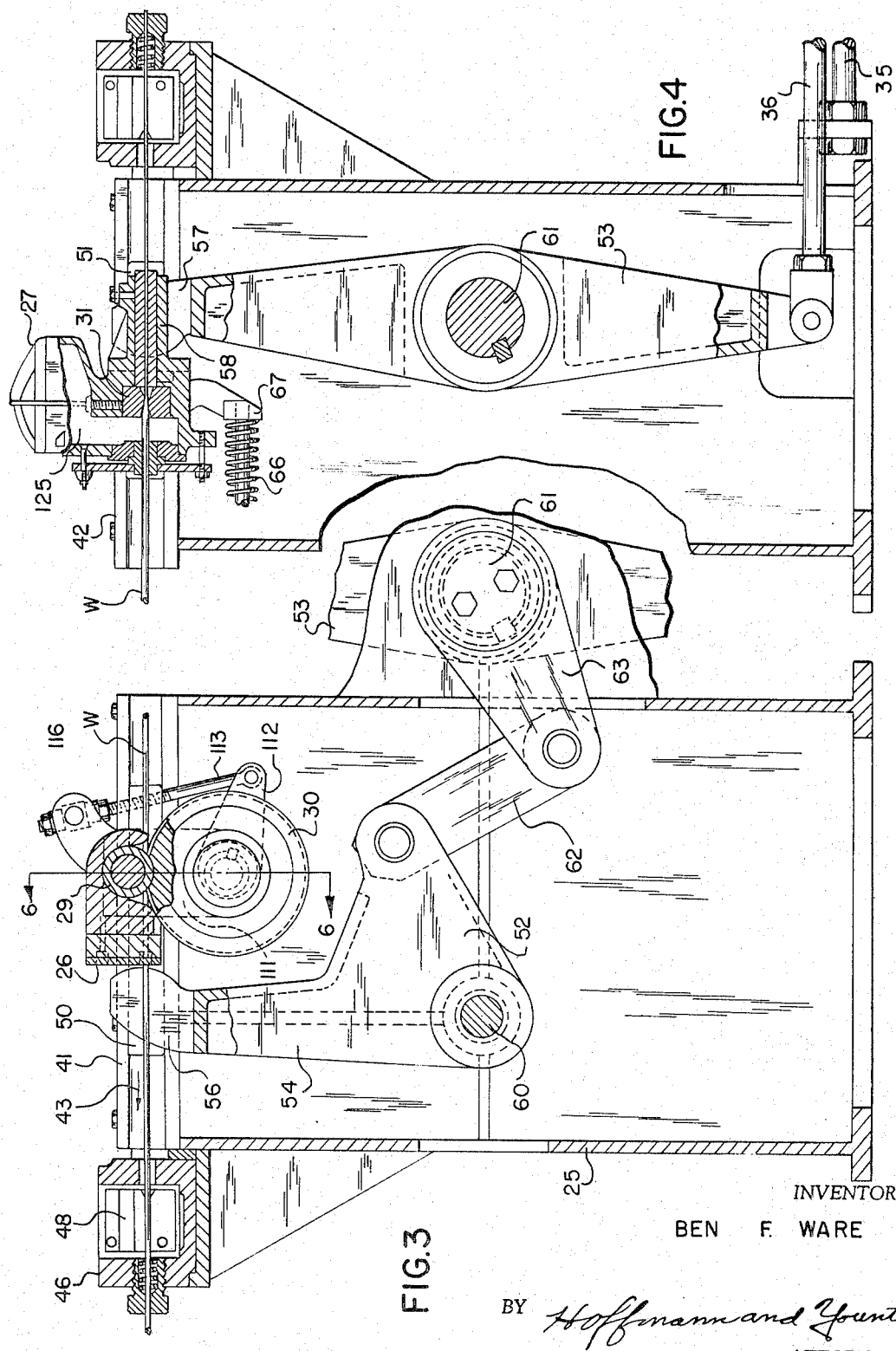

BY Hoffmann and Yount
ATTORNEY

United States Patent Office 3,375,692
Patented Apr. 2, 1968

3,375,692
WIRE WORKING APPARATUS
Ben F. Ware, Euclid, Ohio, assignor to The Ajax Manufacturing Company, Euclid, Ohio, a corporation of Ohio
Filed May 24, 1965, Ser. No. 458,250
3 Claims. (Cl. 72—206)

ABSTRACT OF THE DISCLOSURE

Apparatus for performing work operations on relatively small diameter wire intermittently advanced therethrough including a frame supporting first and second slides spaced along the wire in the direction of its feed, rotatable wire working rolls carried by one slide, and a wire drawing die carried by the other slide, means for reciprocably moving the slides relative to the frame to effect working on the wire by the rolls and die in one direction of movement, and separate wire feeding means in advance of each slide.

---

A wire working apparatus wherein a wire working means other than a drawing die, is pushed over and along the wire during intermittent work strokes in timed relation to and in advance of a drawing die which is also pushed over the wire to effect a drawing operation on the wire.

It is recognized in the art of fabricating drawn wire by cold working that important advantages are realized when the wire being fabricated is preworked immediately before being fed to the fabricating machine. As the wire required by the fabricating machine becomes smaller in diameter, it becomes even more difficult and eventually impossible with known apparatus to supply the fabricating machine with wire preworked by more than a single operation.

This invention deals effectively with the aforementioned problem and, as one of its objects, provides novel wire working apparatus in which a plurality of working operations, performed by reciprocably wire working means can be performed on small diameter wire and the wire fed directly to a fabricating machine without any time delay, or any need for storage or handling of coils of wire, between the successive working operations.

Another important object of the invention is the provision of a novel and improved wire drawing apparatus for working on relatively small diameter wire including wire working rolls for substantially working the wire to produce a noncircular cross-sectional shape, feed means for advancing the wire from the rolls, a drawing die for working the noncircular wire relatively lightly as compared to the working thereof by the rolls, and feed means for advancing the wire from the drawing die, and which apparatus is effective to perform more substantial working of small diameter wire in fewer working passes than has been possible in prior art apparatus of generally similar construction.

As another object thereof, this invention provides novel wire working apparatus of the character referred to having wheel means about which the wire is looped between successive working operations, and which wheel means is rotatably driven for feeding of the wire with respect to a trailing working operation or station so as to prevent or minimize marring and/or distortion of the wire due to an excessive pulling or clamping force which might otherwise need to be applied to the wire by a feeding means located adjacent the final working station.

The invention resides in certain constructions and combinations and arrangements of parts and further advantages of the invention will be apparent to those skilled in the art to which it relates from the following description of the preferred embodiment described with reference to the accompanying drawings forming a part of this specification, in which similar reference characters designate corresponding parts, and in which:

FIG. 1 is a side elevation, with portions in section, showing wire working apparatus embodying the present invention;

FIG. 2 is a plan view of the apparatus shown in FIG. 1;

FIG. 3 is a partial longitudinal vertical section taken through the first of the wire working units of the apparatus, the view being taken as indicated by section line 3—3 of FIG. 2;

FIG. 4 is a similar longitudinal vertical section taken through another of the wire drawing unit as indicated by section line 4—4 of FIG. 2;

Figure 5:
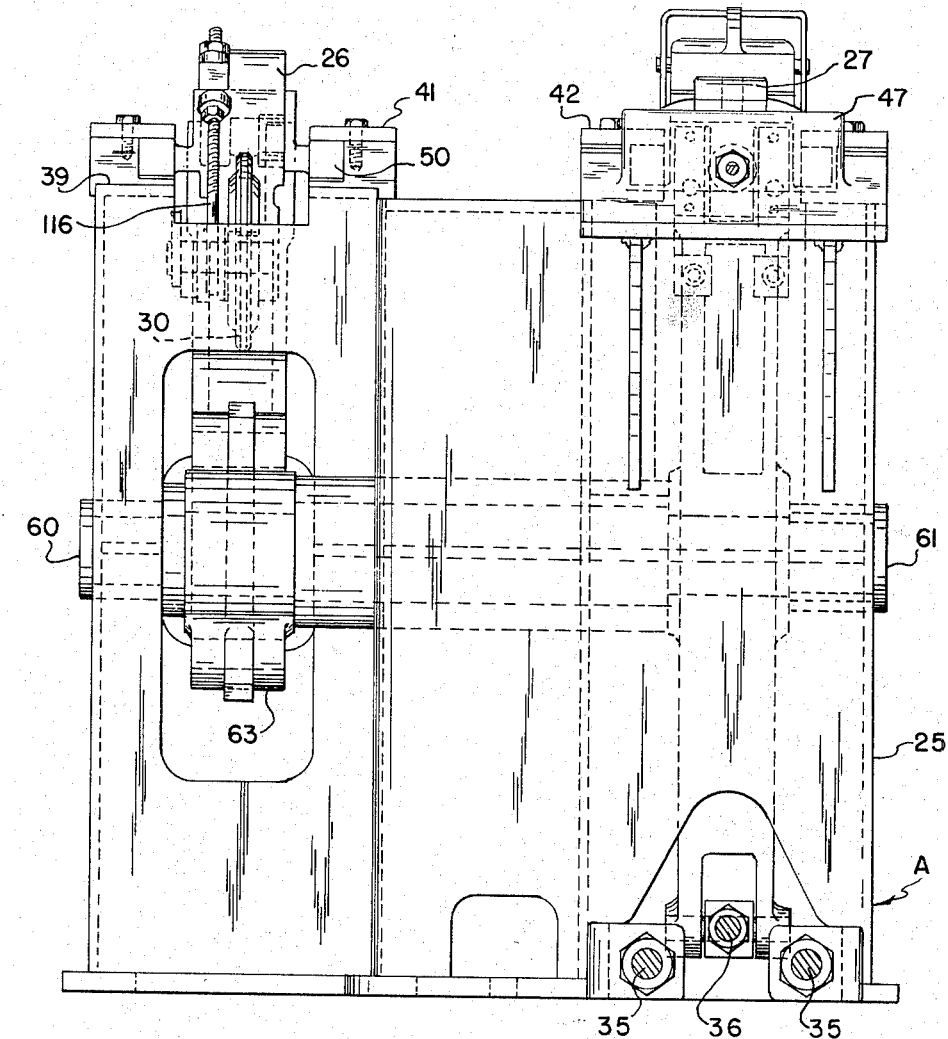
FIG. 5 is an end elevation of the main portion of the apparatus when viewed as indicated by the directional line 5—5 of FIG. 2.

The working wire apparatus shown in FIGS. 1 to 5 and designated generally as A operates to perform a plurality of working operations the last of which is a drawing operation on a wire W of small diameter at different points along the wire and to supply the worked wire directly to a fabricating machine B, such as a cold-header type of machine, at substantially the rate of production operation of the latter. The wire W is supplied to the apparatus A from a supply coil S or the like, and is preferably a hot-rolled or fully-annealed form of wire stock.

The wire working apparatus A comprises, in general, a frame structure 25 common to two wire working units, the first of which is a wire shapening unit 26 and the second a wire drawing unit 27 and a wheel means 28 around which a bight portion of the wire extends in a wrapped relation thereto in passing between the two wire working units. The wire working units 26 and 27 are of the reciprocating type and include cooperating wire shaping rolls 29 and 30 and a drawing die 31, respectively, which rolls and die are pushed over and along the wire W during the working strokes of the units.

The fabricating machine B is of a conventional form having die means (not shown) therein for performing desired operations on the worked wire in accordance with the product being produced, and is here shown as including a feed roll assembly C for feeding the worked wire from the apparatus A to the tools of the fabricating machine. The feed roll assembly C comprises cooperating feed rolls 33 and 34 adapted to grip and advance the wire and which are rotatably driven, preferably from the fabricating machine B and in a timed relation to the operation of the latter.

The wire working apparatus A is connected with the fabricating machine B as by means of tie rods 35 and is operatively driven from the fabricating machine by a drag link 36 connected with the latter. The operating connections by which the feed roll assembly C and the drag link 36 are actuated from the drive mechanism of the fabricating machine B are of a conventional form well known to persons skilled in this art. Since the wire working apparatus A and the associated feed roll assembly C are connected with the fabricating machine B and operated therefrom, they will be driven in a timed relation to the operation of the fabricating machine as well as in a timed relation to each other.

The frame means 25 is adapted to stand on a floor or the like and comprises an upright hollow main portion or frame body 38 and a plurality of guideway portions 39 and 40 connected with the main frame, in this case, in a laterally adjacent or side-by-side relation as shown in FIG. 2. The guideway portions 39 and 40 are provided with guideways 41 and 42 extending lengthwise of the direction of the advance feeding movement of the wire W indicated by the arrows 43. When the guideway portions 39 and 40 are in the laterally adjacent relation mentioned just above, the guideways 41 and 42 thereof are substantially parallel.

The guideway portions 39 and 40 of the frame 25 are provided with hollow grip boxes 46 and 47 in which wire gripping devices 48 and 49 are located for gripping engagement with portions of the wire W extending therethrough. The grip device 48 for the first working unit 26, hereinafter sometimes referred to as the "first" grip device is located on the wire-delivery end of the guideway portion 39 of the frame. The grip device 49 for the second working unit 27, hereinafter sometimes referred to as the "second" grip device is located on the wire-delivery end of the guideway portion 40.

The first and second wire working units 26 and 27 include first and second slides 50 and 51 which support the wire shaping rolls 29 and 30 and the drawing die 31, respectively, and are slidable in the guideways 41 and 42 so that the wire working tools carried thereby, that is, the shaping rolls 29 and 30 and the die 31, can be moved or pushed over and along the wire W in working engagement therewith. The wire working units 26 and 27 are moved through their working strokes by swingable operating levers 52 and 53, respectively, which push the slides 50 and 51 during the work strokes thereof. The lever 52 is a bell crank lever having an upwardly extending arm 54 co-operable with the slide 50 and the lever 53 is a straight lever the upper portion of which co-operates with the slide 51.

The upper end of the lever 54 is provided with a forked portion 56 which straddles the wire W and is adapted for pushing engagement with the slide 50 at laterally spaced points thereof. Similarly, the upper end of the lever 53 is provided with a forked portion 57 which straddles a projecting hollow axial portion 58 of the slide 51 and is adapted for pushing engagement with such slide at laterally spaced points thereof.

The lever 52 is swingable on a transverse pivot shaft 60 mounted in the guideway portion 39 of the frame 25 and the lever 53 is swingably supported by, and keyed to, a transverse shaft 61 which is rockably mounted in the frame 25 and includes a shaft projection at one end thereof. The lower part of the lever 53 is connected with the drag link 36 extending from the fabricating machine B, and the lever 52 is connected with the projecting portion of the shaft 61 by means of a connecting link 62 and a lever 63 keyed on such projecting shaft portion.

The grip devices 48 and 49 are of a conventional form each comprising a pair of grip blocks having co-operating grip portions between which the wire W extends and which blocks are automatically effective on the wire to grip the same for preventing backward movement thereof during the working strokes of the slides 50 and 51. The grip blocks operate to automatically release the wire W during advance feeding movements of the wire which take place between the intermittent working strokes of the slides.

During the work strokes of the slides 50 and 51 produced by their respective actuating levers 52 and 53, the tools carried thereby are pushed along the wire W in a direction away from the associated grip devices 48 and 49. During the return swinging movement of the levers 52 and 53, their forked portions 56 and 57 are disengageable from the associated slides 50 and 51. The advance feeding movement of the drawn wire takes place during the return swinging movements of the slide pushing levers 52 and 53. During such feeding movement of the wire, the tools and their associated slides 50 and 51 are moved in the wire advancing direction by and in unison with the portions of the wire which are then located or engaged in the respective tools.

The feeding movement of the wire W is produced by the action of the wheel means 28 and the feed roll assembly C assisted, if desired, by compression spring means 66 associated with the slide 51 of the drawing unit 27 the one end of which spring engages a depending spring seat 67 of the slide 51. The wheel means 28 serves as the feed means for the wire working unit 26 and to receive the wire delivered therefrom and direct it to the second working unit 27. This latter function of the wheel means 28 is accomplished in a manner to prevent kinking of the wire and disengagement of the bight portion thereof from the wheel means when slack occurs in the wire between the two units.

The wheel means 28 comprises a base 70 located adjacent to the frame 25, a post or spindle 71 mounted in the base and extending thereabove, and a wheel 72 rotatably supported by the post as by having a center sleeve or hub 73 journalled on the upper end portion of the post. The wheel member 72 has an annular rim portion 74 and an annular groove 75 extending around the outer periphery of the rim for receiving the bight of the wire in a wrapped relation to such rim portion.

In order to prevent kinking and/or disengagement of the wire from the wheel member 72, the peripheral groove 75 is of a slot-like form and is of relatively narrow width in a direction along the rotation axis of the wheel member, and additionally, is relatively deep in a direction radially of the wheel member. The axial width of the groove 75 is only enough greater than the diameter of the wire passing thereabout to freely accommodate the latter in a manner to prevent kinking thereof. The radial depth of the annular groove 75 is such that the maximum amount of slackening occurring during the operation of the apparatus will be accommodated by radial shifting of the wire in the groove but with the wire always remaining in the groove and thus prevented from becoming completely disengaged from the wheel member.

The rim portion of the wheel member 72 can be of any suitable construction which will provide an annular groove of the axially-narrow radially-deep character explained and is here shown as comprising a radially projecting annular blade or tongue 77 on the rim member 74 on the outer side thereof, and a pair of axially spaced coextending flat ring members 78 and 79 secured to the blade 77 on opposite sides thereof as by welding or the like. The ring members 78 and 79 preferably have their inner annular edges in abutting engagement with the rim member 74 on opposite sides of the projecting blade 77. The outer annular edge portions of the ring members 78 and 79 are preferably flared or deflected away from each other to provide the annular groove 75 with a tapered entry portion to facilitate movement of the wire thereinto.

The wheel means 28 also comprises driving means for imparting rotation to the wheel member 72. The driving means can be of any suitable form or construction and is here shown as comprising a support member 81 fixed on the spindle 71 and to which a variable-speed driving unit 82 attached to a bracket 83 is swingably mounted on the support member by pivot means 84. The driving unit 82, shown, comprises an electric motor 87 connected with a drive sprocket 88 through a manually adjustable speed-change gearing 89 for adjusting the speed in accordance with the speed at which the wheel member 72 is desired to be driven. The drive sprocket 88 is connected with a driven sprocket 91 of the wheel member 72 by a sprocket chain 92. Adjusting screw means 93 connected between the support member 81 and the bracket 83 provides for swinging of the latter for tightening the chain 92.

The slide 50 of the wire shaping unit 26 has lateral projections 100 operable in the guideway 41 of the guideway frame portion 39 and carries the upper and lower wire shaping rolls 29 and 30 between which the wire W passes and by which such wire is subjected to a desired shaping operation.

In the apparatus shown in FIGS. 1 to 5, the shaping operation being performed on the wire W is a flattening operation by which one side of the wire, in this case the top portion thereof, is flattened in advance of the drawing operation performed by the second wire working unit. The upper roll 29 is accordingly a flat-surfaced roll, that is a cylindrical roll, whose pressure-engagement with the wire causes a flattening thereof. The upper roll is of a relatively small diameter so as to have only a small area of working contact with the wire for application of maximum working pressure thereto and is freely rotatable by reason of its ends being received in a pair of antifriction bearings 101. The lower roll 30 is a support roll for the wire W and supports the same during the flattening thereof by the upper roll 29. The lower roll is of a relatively large diameter in comparison with the upper roll and has an annular groove 102 in the periphery thereof for receiving the wire W and whose cross-sectional shape corresponds with that of the wire and, in this case, is a concave or semicircular groove in which the lower segment of the wire lies. The lower roll 30 is freely rotatable on an antifriction bearing 103 which is mounted on an eccentric portion 104 of a pivot shaft 105.

Figure 6:
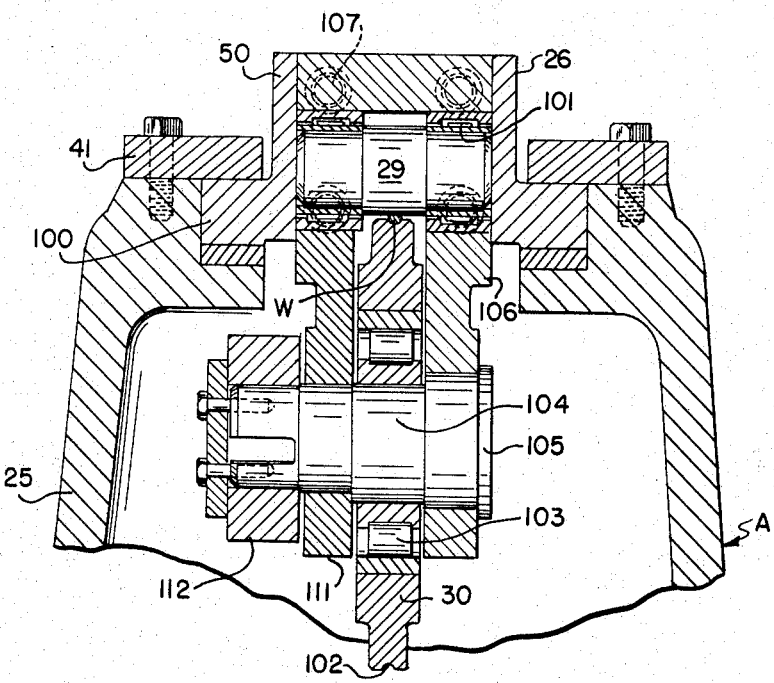
FIG. 6 is a transverse vertical section, with parts in elevation, taken as indicated by the section line 6—6 of FIG. 3.
Figure 8:
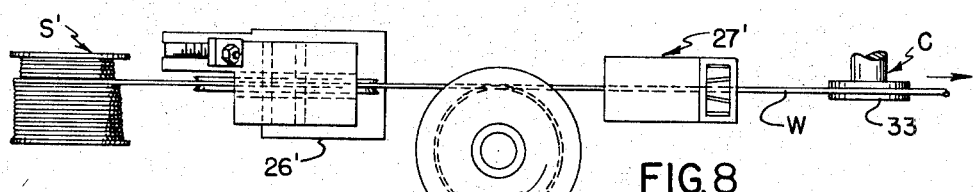
FIG. 8 is a view showing a modified arrangement of the apparatus shown in FIG. 1.
Figure 7:
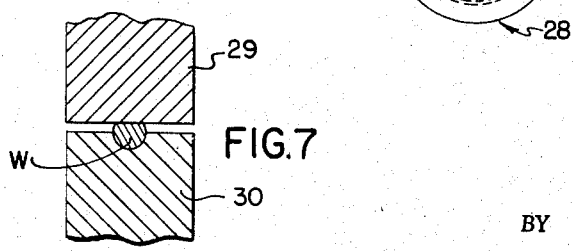
FIG. 7 is an enlarged view of a portion of FIG. 6.

The co-operating rolls 29 and 30 of the shaping device 26 are supported by a bracket 106 which is attached to, by screws 107, and forms a part of the slide 50. A passage 110 extending through the bracket 106 and the adjacent portion of the slide 50 accommodates the wire W as it enters and leaves the bight or pass of the co-operating rolls 29 and 30. The anti-friction support bearings 101 for the upper roll 29 are mounted in the bracket 106 as shown in FIG. 6, and the mounting shaft 105 for the lower roll 30 is mounted in depending arms 111 of the bracket 106. The width of the pass between the co-operating rolls 29 and 30, and the pressure applied to the wire W for the shaping operation, can be varied to suit the size and type of wire being supplied as well as the particular configuration to which the wire is to be shaped or flattened during the shaping operation. For this purpose one of the co-operating rolls, in this case the lower roll 30, is shiftable for varying its position relative to the other roll and the wire. For this purpose the mounting shaft 105 for the lower roll 30 is rotatable in the arms 111 of the bracket 106 so that the eccentric portion 104 can be rotated to shift the lower roll toward or away from the upper roll 29, depending upon the direction of the pivotal movement imparted to the mounting shaft. The shaft 105 can be thus rotated by suitable means, in this case, by an actuating lever 112 keyed thereto to which lever swinging movement is imparted by a link 113 connected to the outer end of the lever. The other end of the link is threaded and extends through a sleeve of a trunnion block rockably mounted on or in a rigid arm or projection 116 of the bracket 106. Upper and lower adjusting nuts mounted on the threaded portion of the link 113 and engageable with the ends of the trunnion sleeve provide for adjusting the length of the link 113 in opposite directions for producing the roll-adjusting swinging movement of the lever 112.

The slide 50 and in turn the co-operating or shaping rolls 29 and 30 carried thereby are actuated through their working stroke by being pushed over and along the wire W while the latter is being held against backward movement by the grip device 48. The movement of the slide 50 through the working stroke is produced by the lever 52. A thrust plate is preferably attached to the slide 50 to take the thrust of the lever 52. The return movement of the shaping device or unit 26 is imparted thereto by the wire W when the latter is advanced, as explained above, by the action of the feed wheel means 18.

Reverting to the drawing unit 27 the die-supporting slide 51 includes a lubricant chamber 125 etc., is conventional in form and construction and will not be described in detail. The drawing die 31 is provided in this instance with an orifice of a cross-sectional shape suitable for, or corresponding substantially with, the cross-sectional shape imparted to the wire by the rolls of the shaping unit 26. The drawing operation performed on the wire by the die 31 reduces the cross-sectional size of the wire so that the drawn wire, although of a smaller cross-sectional size than the portion of the wire entering the die orifice, is still of a noncircular or flattened shape. The gripping portions of the gripping devices are provided with flat portions to engage the flat side of the flattened wire. The co-operating feed rolls of the feed assembly C are also formed in a manner such that they properly engage the drawn wire. The upper feed roll in the present instance has a flat or cylindrical peripheral surface which engages the flat on the drawn wire, and the lower feed roll has a concave peripheral groove in which the semicircular lower portion or segment of the drawn wire is received.

In the operation of the wire working apparatus A, the working stroke of the first wire working unit 26 produced by the first lever 52 causes elongation of the wire W resulting from the work done thereon the wire is free to move back toward the coil S, and such elongation creates no problem. During the return swing of the lever 52 the drawn wire W is advanced by a pulling action applied thereto by the wheel means 28. This advance feeding of the wire causes the return movement of the slide 50 and the wire shaping rolls carried thereby and, at the same time, pulls additional wire stock from the coil S and through the gripping device 48.

During the drawing stroke of the die 31 produced by the lever 53 the elongation of the wire W resulting from this drawing stroke moves in a backward direction toward the wheel means 28 and causes a slackening of the wire about the wheel means 28. Upon the completion of the drawing stroke of the die 31, the lever 53 is swung through its return movement and the feed roll assembly C is operated to advance the wire through the grip device 49 and thereby applies a pulling action to the slide 51 and the die 31 by which these members are moved through their return stroke. The feeding of the wire by the feed roll assembly C causes a tightening of the bight or loop of wire on the wheel means 28 and enables the latter to produce its above-described feeding action for the portion of the wire extending thereto from the coil S. The speed at which the wheel member of the wheel means 28 is driven bears an important relation to the speed of actuation of the feed roll assembly C. The wheel member is driven at a speed to provide a linear rate of advance movement for the wire fed thereby which is at least equal to, and preferably greater than, the maximum linear advance feeding of the wire fed by the feed roll assembly C. This desired speed for the wheel member is obtained by adjustment of the speed-change gearing and, when the desired setting has been established in accordance with the rate of operation of the fabricating machine B and the working units 26 and 27, the driving rate for the wheel member usually remains constant but can be varied whenever needed by actuation of the control means.

Whatever marring of the wire occurs by reason of its engagement with the wheel member 72 during the feeding action produced by the latter will be eliminated during the subsequent drawing operation. The faster rate of drive described above for the wheel member 28 prevents the same from retarding, or becoming a drag on, the advance feeding movement imparted to the wire by the feed roll device C.

By having the wheel means 28 operate as a feed means for advancing the wire W through the first working unit 26, it will be seen that the feed roll assembly C need operate only as a feeding means for advancing the wire through the second working unit 27 and for supplying the worked or drawn wire to the fabricating machine B. The clamping force of the feed rolls 33 and 34 against the wire, and the pulling force applied by the feed assembly C to the wire, can therefore be smaller than if this feed device were required to also advance the wire through the first wire working unit 26 and to withdraw stock from the coil S. The smaller clamping and pulling forces thus needed to be applied to the wire by the feed roll assembly C reduces or minimizes the likelihood of flattening or otherwise damaging the drawn wire and permits the use of much smaller wire than would otherwise be the case. The result is that articles of a more regular and satisfactory form can be produced from smaller wire by the fabricating machine B than was heretofore possible. This result of being able to fabricate smaller wire than heretofore possible in the manner referred to is due also in part to the use of a separate gripping unit device with each wire working unit or operation.

The relative lengths of the work strokes of the slides 50 and 51 will be a function of the elongation, if any, of the wire resulting from the working operations performed thereon. The wheel means 28 is preferably located so that the annular groove 75 thereof will lie in a horizontal plane which is also the horizontal plane containing the axes of the wire working units. The rim portion 74 of the wheel member 72 can be of any suitable diameter and the wrapped engagement of the wire therewith should preferably be at least 180° in angular extent. When the diameter of the rim portion of the wheel member 72 is greater than the lateral spacing between the wire working units, a guide roller or sheave 130 can be provided on the frame for directing the wire into the drawing unit 27.

The first and second wire working units can be located in an in-line relation, if desired, and the feed wheel means located at a point between these units. In this event, the wire should extend around the feed wheel means interposed between the two units. Such an arrangement is illustrated in FIG. 10, in which the corresponding parts are designated by the same reference characters having a prime mark affixed thereto.

From the foregoing description of the preferred embodiments of the invention it will be apparent that the objects heretofore enumerated and others have been accomplished and that there has been provided an apparatus for performing a forming operation such as flattening upon wire as well as a drawing operation, which apparatus is adapted to be positioned immediately in front of a fabricating machine so that the worked wire can be fed directly to the fabricating machine. Furthermore, the apparatus is capable of handling smaller wire than could be handled by prior machines because of the use of separate gripping devices for each wire working operation.

While preferred embodiment of the invention has been shown and described in considerable detail, the invention is not limited to the particular construction shown, and it is the intention to cover hereby all adaptations, modifications and uses thereof which come within the practice of those skilled in the art to which the invention relates and the scope of the appended claims.

What I claim is:

1. In apparatus for performing two different types of wire working operations on relatively small diameter wire stock intermittently advanced therethrough, frame means, first and second slides arranged in series relation with respect to the path of movement of the wire through the apparatus, means for supporting said slides in said frame means for linear movement forward and backward along positions of said path of movement of the wire, rotatably mounted wire working rolls having cooperating portions defining a noncircular pass therebetween carried by said first slide for roll working the wire to a noncircular cross-sectional shape upon movement of said first slide backwardly of the direction in which the wire is advanced along said path of movement, a drawing die carried by said second slide for working the wire upon movement of said second slide backwardly of the direction in which the wire is advanced along said path of movement, said drawing die having a noncircular orifice the cross-sectional shape of which corresponds approximately to the shape of the pass between said wire working rolls, power means for intermittently moving said slides in said backwardly direction, stationary grip devices on said frame means at the forward sides of said slides adapted to grip the wire and prevent backward movement thereof during said backward movements of said slides but permitting advance or forward movement of said wire along said path, separate feed means in advance of each of said grip devices for intermittently advancing the wire along said path and moving said slides in the forward direction, and power means for operating said feed means.

2. In apparatus for performing a plurality of different types of wire working operations on relatively small diameter wire stock intermittently advanced therethrough, frame means, first and second slides arranged in series relation with respect to the path of movement of the wire through the apparatus, means for supporting said slides in said frame means for linear movement forward and backward along positions of said path of movement of the wire, rotatably mounted wire working rolls having cooperating portions defining a noncircular pass therebetween carried by said first slide for roll working the wire to a noncircular cross-sectional shape upon movement of said first slide backwardly of the direction in which the wire is advanced along said path of movement, a drawing die carried by said second slide for working the wire upon movement of said second slide backwardly of the direction in which the wire is advanced along said path of movement, said drawing die having a noncircular orifice the cross-sectional shape of which corresponds approximately to the shape of the pass between said wire working rolls, power-operated means for intermittently moving each of said slides in said backwardly direction in timed relation to one another, stationary grip devices on said frame means at the forward sides of said slides adapted to grip the wire and prevent backward movement thereof during said backward movements of said slides but permitting advance or forward movement of said wire along said path, separate feed means in advance of each of said grip devices for intermittently advancing the wire along said path and moving said slides in the forward direction, one of said feed means interpositioned between said first and second slides comprising a wheel around which the wire is at least partially wrapped, and power means for rotating said wheel to advance said wire from said first slide.

3. In apparatus for performing a plurality of different types of wire working operations on relatively small diameter wire stock intermittently advanced therethrough, frame means, first and second slides arranged in series relation with respect to the path of movement of the wire through the apparatus, means for supporting said slides in laterally adjacent relation in said frame means for linear movement forward and backward along positions of said path of movement of the wire, rotatably mounted wire working rolls having cooperating portions defining a noncircular pass therebetween carried by said first slide for roll working the wire to a noncircular cross-sectional shape upon movement of said first slide backwardly of the direction in which the wire is advanced along said path of movement, a drawing die carried by said second slide for working the wire upon movement of said second slide backwardly of the direction in which the wire is advanced along said path of movement, said drawing die having a noncircular orifice the cross-sectional shape of which corresponds approximately to the shape of the pass between said wire working rolls, power means for intermittently moving said slides in said backwardly directions in timed relation to one another, stationary grip devices on said frame means at the forward sides of said slides adapted to grip the wire and prevent backward movement thereof during said backward movements of said slides but permitting advance or forward movement of said wire along said path, separate feed means in advance of each of said grip devices for intermitently advancing the wire along said path and moving said slides in the forward direction, one of said feed means interpositioned between said first and second slides comprising a wheel supported for rotation about an axis normal to the plane of said path of movement of said wire between said two laterally adjacent slides around which the wire is at least partially wrapped, and power means for rotating said wheel to advance said wire from said first slide.

References Cited

UNITED STATES PATENTS

| | | | |
|---|---|---|---|
| 1,894,703 | 1/1933 | Perice | 72—160 |
| 2,310,916 | 2/1943 | Gaines et al. | 72—278 XR |
| 2,612,797 | 10/1952 | Johnston | 72—206 |
| 2,728,447 | 12/1955 | Wore | 72—290 XR |
| 2,797,799 | 7/1957 | Ehlert | 72—285 XR |
| 2,880,854 | 4/1959 | Friedman | 72—290 |
| 3,017,016 | 1/1962 | Ehlert et al. | 72—290 XR |
| 3,183,699 | 5/1965 | Ehlert | 72—161 |
| 3,273,372 | 9/1966 | Ehlert | 72—285 XR |
| 3,184,943 | 5/1965 | Wore | 72—285 XR |

CHARLES W. LANHAM, *Primary Examiner.*
A. RUDERMAN, *Assistant Examiner.*